US010034452B2

(12) United States Patent
Lowenthal (10) Patent No.: US 10,034,452 B2
(45) Date of Patent: Jul. 31, 2018

(54) PET FOOD DISPENSER (71) Applicant: Darlene Lowenthal, Riverwoods, IL (US)

(72) Inventor: Darlene Lowenthal, Riverwoods, IL (US)

(*) Notice: Subject to any disclaimer, the term of this patent is extended or adjusted under 35 U.S.C. 154(b) by 158 days.

(21) Appl. No.: 15/249,190

(22) Filed: Aug. 26, 2016

(65) Prior Publication Data

US 2017/0055492 A1  Mar. 2, 2017

Related U.S. Application Data (60) Provisional application No. 62/211,328, filed on Aug. 28, 2015.

(51) Int. Cl.
*A01K 5/02* (2006.01)
*A01K 5/01* (2006.01)

(52) U.S. Cl.
CPC .......... *A01K 5/0114* (2013.01); *A01K 5/0225* (2013.01)

(58) Field of Classification Search
CPC .. A01K 5/0114; A01K 5/0225; A01K 39/012; A01K 39/0125
USPC .................................. 119/52.1, 53, 54, 56.1
See application file for complete search history.

(56) References Cited

U.S. PATENT DOCUMENTS

| | | | | |
|---|---|---|---|---|
| 3,575,141 A * | 4/1971 | Elkins | A01K 5/025 | 119/55 |
| 4,735,171 A * | 4/1988 | Essex | A01K 5/0291 | 119/51.12 |
| 5,184,575 A * | 2/1993 | Reinartz | A01K 1/0107 | 119/163 |
| 5,613,464 A * | 3/1997 | Petzel | A01K 5/025 | 119/55 |
| 5,819,686 A * | 10/1998 | Credeur | A01K 5/0225 | 119/51.5 |
| 7,040,249 B1 * | 5/2006 | Mushen | A01K 5/0225 | 119/51.5 |
| 7,780,027 B2 * | 8/2010 | Coady | A01K 5/0225 | 119/51.03 |
| 8,096,265 B1 * | 1/2012 | Wisecarver | A01K 5/0225 | 119/56.1 |
| 8,701,595 B2 * | 4/2014 | Jin | A01K 5/0291 | 119/51.01 |
| 2014/0174368 A1 * | 6/2014 | Salinas | A01K 5/0291 | 119/51.11 |
| 2016/0157461 A1 * | 6/2016 | Hill | A01K 5/0142 | 119/51.01 |

* cited by examiner

*Primary Examiner* — David J Parsley
(74) *Attorney, Agent, or Firm* — Justin Lampel (57) ABSTRACT

A pet food dispenser is provided. The pet food dispenser has a main housing unit having a bottom. The bottom of the main housing unit has an opening, having an air-tight seal, wherein pet food passes through the opening to a receiving dish. The top of the main housing dispenser has a hinged lid wherein pet food may be introduced into the interior of the main housing dispenser. The hinged lid has an air-tight seal which keeps the pet food located inside fresh. New pet food may be placed into the interior of the main housing unit at the top of the housing while older pet food exits through the opening to at the bottom of the main housing unit. As a result, the pet food is consistently rotated through the device and healthy and unspoiled pet food is consistently provided to the pet.

11 Claims, 7 Drawing Sheets

PET FOOD DISPENSER

CROSS REFERENCE TO RELATED APPLICATION

The following application is based on and claims the priority benefit of U.S. Provisional application Ser. No.: 62/211,328 filed on Aug. 28, 2015, currently co-pending; the entire contents of which are incorporated by reference.

BACKGROUND OF THE INVENTION

A pet food dispenser is provided. The pet food dispenser has a main housing unit having a bottom which is tapered and wherein the main housing unit, in an embodiment, is elevated above a plurality of legs. The bottom of the main housing unit has an opening, having an air-tight seal, wherein pet food passes through the opening to a receiving dish located below the opening and on, in an embodiment, a storage shelf. The top of the main housing dispenser has a hinged lid wherein pet food may be introduced into the interior of the main housing dispenser. The hinged lid has an air-tight seal which keeps the pet food located inside fresh. New pet food may be placed into the interior of the main housing unit at the top of the housing while older pet food exits through the opening at the bottom of the main housing unit. As a result, the pet food is consistently rotated through the device and healthy and unspoiled pet food is consistently provided to the pet. In a first embodiment, the device has a crank shaft for dispensing the proper amount of pet food and in a second embodiment a sliding closing shield is provided. Further, the device may lack the crank shaft and sliding cover and merely have an air-tight sealed lid at the bottom of the main housing.

Providing pet food storage devices is known in the prior art. For example, U.S. Pat. No. 8,245,665 to Willed discloses a food and water dispenser for pets having a base structure, having a base floor and a surrounding substantially vertical base wall structure, capable of holding water; a food bowl, having a bowl floor and a surrounding substantially vertical bowl wall structure attached to the base floor within the base structure but not contacting the base wall structure, the bowl capable of holding food; and a dual-chambered container attached within the base structure but not contacting the base wall structure, capable of receiving, storing and dispensing on demand from a first chamber dry pet food into the food bowl and on demand from a second chamber water into the base structure. The base structure receives dispensed water from the second chamber to create a water-filled moat that inhibits crawling insects from accessing the food bowl or food stored in the first chamber of the dual chambered container.

Further, U.S. Pat. No. 8,230,808 to Lai discloses a pet food dispenser having a container, a bottom lid and a receiving plate. The bottom lid is covered on a bottom opening of the container and has multiple through holes. The receiving plate is connected to the bottom lid. A gap is formed between the receiving plate and the bottom lid. The pet foods in the container drop out from the through holes of the bottom lid. Because the receiving plate collects dropped pet food, only some pet food is released for the pets to eat. The pets need to push the pet food dispenser to topple and roll so that more and more pet food is released. Therefore, the pet food dispenser efficiently leads the pets to move more by using food to attract the pets.

However, the prior patents fail to describe a pet food dispenser which is easy to use and efficient as is described in the present application. Further, these patents fail to provide a pet food dispenser which allows the user to insert various pet food dishes onto a storage shelf wherein fresh and health pet food is dispensed from a main housing unit into a receiving dish located on the storage shelf. The present application also provides for an air-tight seal and allows for the user to store up to thirty pounds of food.

SUMMARY OF THE INVENTION

A pet food dispenser is provided. The pet food dispenser has a main housing unit having a bottom which is tapered and wherein the main housing unit, in an embodiment, is elevated above a plurality of legs. The bottom of the main housing unit has an opening, having an air-tight seal, wherein pet food passes through the opening to a receiving dish located below the opening and on, in an embodiment, a storage shelf. The top of the main housing dispenser has a hinged lid wherein pet food may be introduced into the interior of the main housing dispenser. The hinged lid has an air-tight seal which keeps the pet food located inside fresh. New pet food may be placed into the interior of the main housing unit at the top of the housing while older pet food exits through the opening at the bottom of the main housing unit. As a result, the pet food is consistently rotated through the device and healthy and unspoiled pet food is consistently provided to the pet. In a first embodiment, the device has a crank shaft for dispensing the proper amount of pet food and in a second embodiment a sliding closing shield is provided. Further, the device may lack the crank shaft and sliding cover and merely have an air-tight sealed lid at the bottom of the main housing.

An advantage of the present pet food dispenser is that the present pet food dispenser rotates the old pet food within the interior of the device so that pet food does not spoil. In particular, fresh food is added to the top and older food exits through the bottom.

Another advantage of the present pet food dispenser is that the present pet food dispenser allows a user to use various sizes of pet receiving dishes to receive pet food from the dispenser.

An advantage of the present pet food dispenser is that the present pet food dispenser has an air-tight seal at both the top and the bottom of the device therein providing a fresh environment for the pet food. In the embodiment having a crank shaft or sliding cover, an air-tight seal is also located on the side of the device.

Yet another advantage of the present pet food dispenser is that the main housing unit may be removed from the plurality of legs for cleaning.

Still another advantage of the present pet food dispenser is that the present pet food dispenser is ideal for dry pet food.

Further, an advantage of the present pet food dispenser is that the present pet food dispenser is air-tight and sealed which keeps the pet food fresh and healthy.

For a more complete understanding of the above listed features and advantages of the present pet food dispenser apparatus reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A pet food dispenser is provided. The pet food dispenser has a main housing unit having a bottom which is tapered and wherein the main housing unit, in an embodiment, is elevated above a plurality of legs. The bottom of the main housing unit has an opening, having an air-tight seal, wherein pet food passes through the opening to a receiving dish located below the opening and on, in an embodiment, a storage shelf. The top of the main housing dispenser has a hinged lid wherein pet food may be introduced into the interior of the main housing dispenser. The hinged lid has an air-tight seal which keeps the pet food located inside fresh. New pet food may be placed into the interior of the main housing unit at the top of the housing while older pet food exits through the opening at the bottom of the main housing unit. As a result, the pet food is consistently rotated through the device and healthy and unspoiled pet food is consistently provided to the pet. In a first embodiment, the device has a crank shaft for dispensing the proper amount of pet food and in a second embodiment a sliding closing shield is provided. Further, the device may lack the crank shaft and sliding cover and merely have an air-tight sealed lid at the bottom of the main housing.

Figure 1:
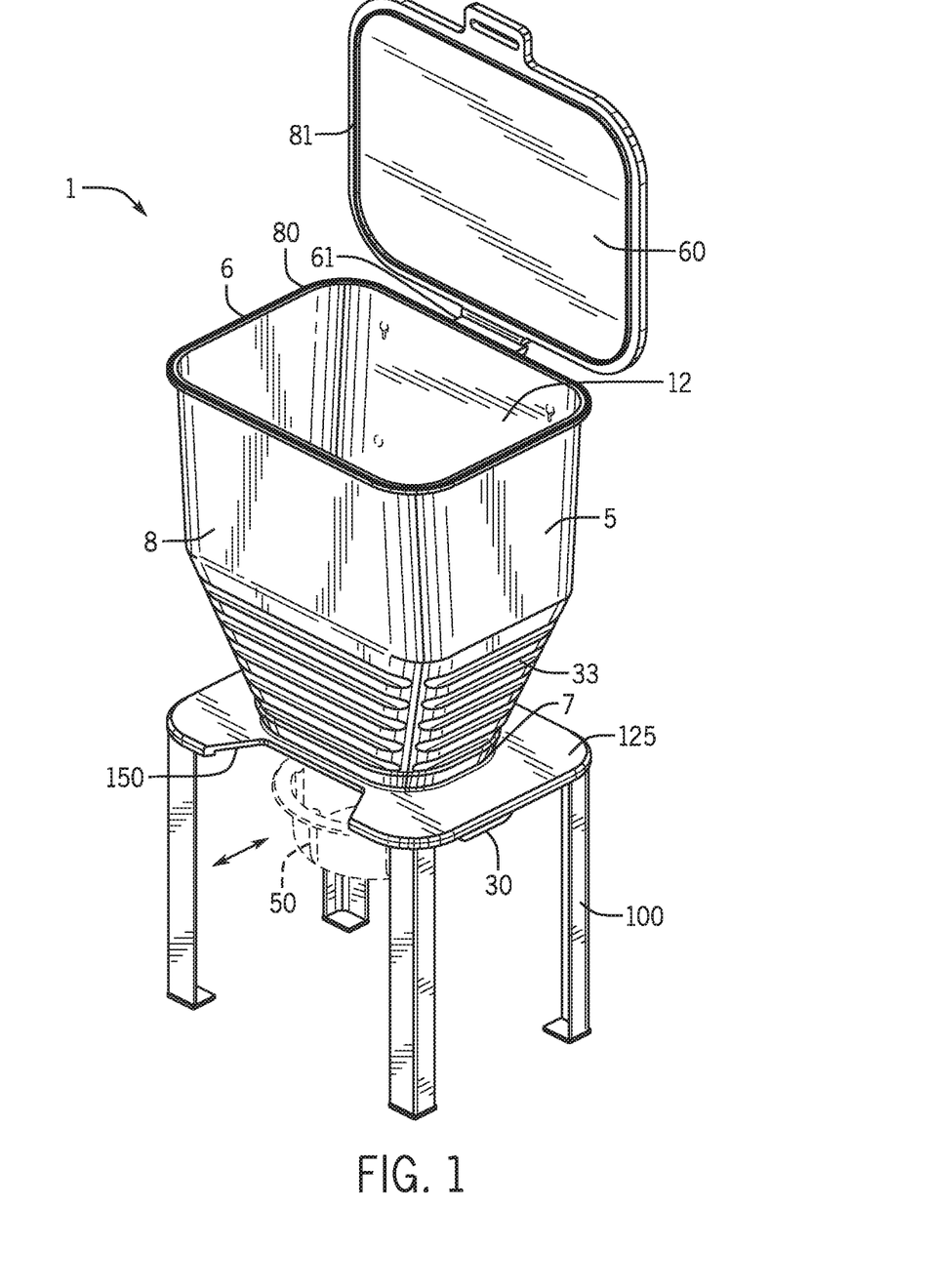
FIG. 1 illustrates a perspective view of the pet food dispenser.
Figure 2:
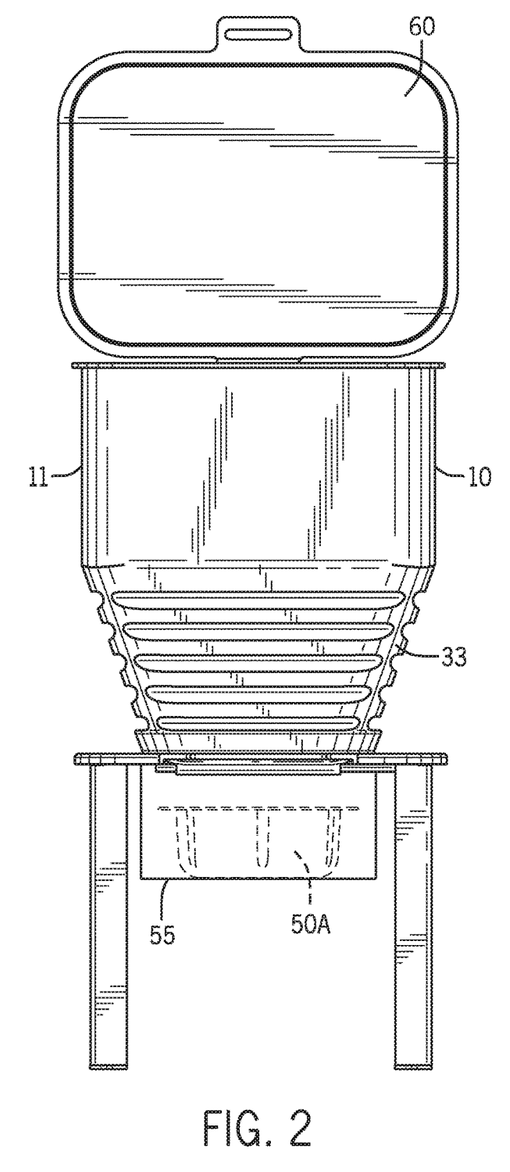
FIG. 2 illustrates a front view of the pet food dispenser wherein the lid is open and capable of receiving new pet food.
Figure 5:
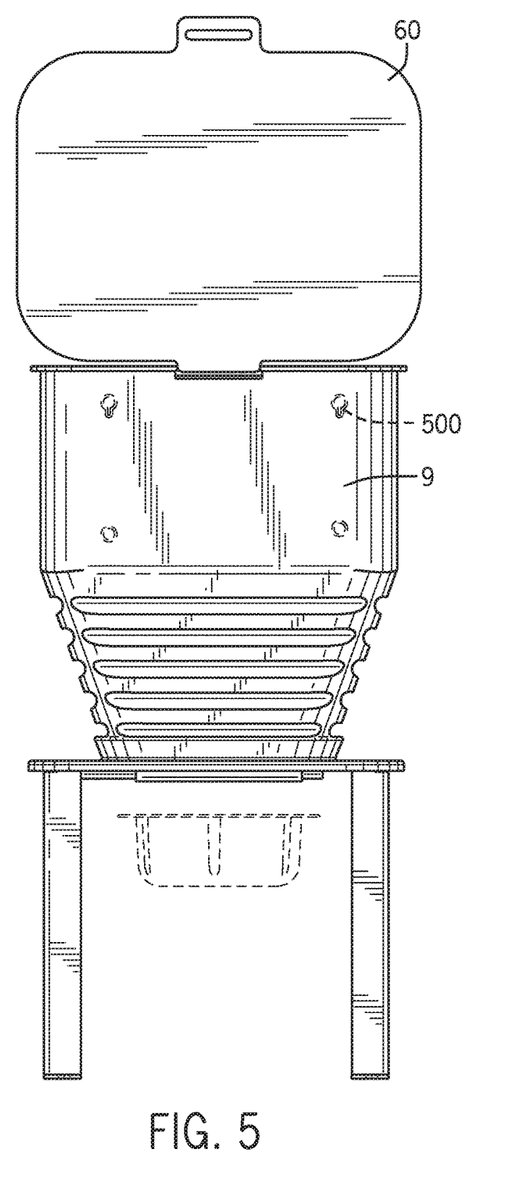
FIG. 5 illustrates a back view of the pet food dispenser wherein the device may also have openings for hanging on a wall.

Referring first to FIG. 1, in an embodiment a pet food dispenser 1 is provided. The pet food dispenser 1 may have a main housing unit 5, a receiving dish 50 and a plurality of legs 100. The main housing unit 5 may have a top 6, a bottom 7, a front 8, a back 9 (FIG. 5), a first side 10 (FIG. 2), a second side 11 and a generally hollow interior 12. In an embodiment, the main housing unit 5 is preferably made of a durable material, such as plastic. Further, in an embodiment, the main housing unit 5 may have an antibacterial agent dispersed within the plastic to increase sanitation. In an embodiment, a lid 60 may be secured via a hinge 61 to the back 9 of the main housing unit 5 wherein the lid 60 allows a user to selectively gain access to the generally hollow interior 12 of the device 1 while also protecting the pet food 20 (FIG. 8) located within the generally hollow interior 12 when the device 1 is not being filled.

In an embodiment, the lid 60 may have an air-tight seal 81 which keeps the pet food 20 inside the interior 12 of the main housing unit 5 fresh and healthy. In particular, a rubber gasket seal 80 may run along the top 6 edge of the main housing unit 5 and a corresponding rubber gasket seal 81 may run along the underside of the lid 60. When the pet food 20 is inserted into the interior 12 of the main housing unit 5, the lid 60 may be shut and the two rubber gasket seals 80, 81 may meet and create an air-tight seal within the interior 12 of the main housing unit 5. Further, because the pet food 20 exits from the bottom 7 of the main housing unit 5, a user need not open the top lid 60 until the pet food 20 is substantially or fully used up, which could take weeks in that the device 1 may hold up to thirty pounds of pet food 20. As a result, the pet food 12 inside the main housing unit 5 remains fresh.

Figure 6:
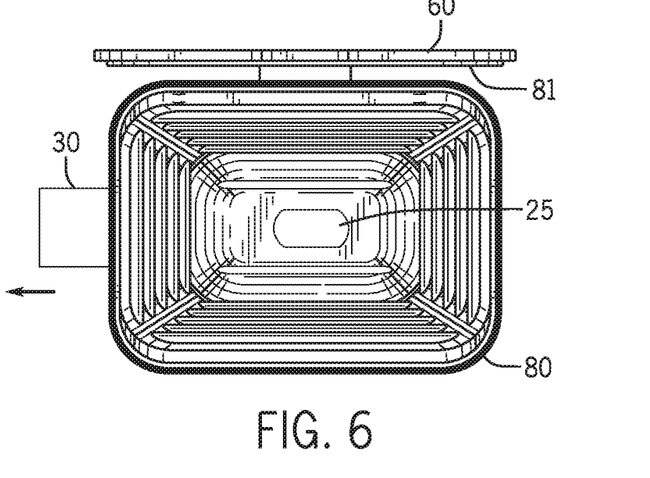
FIG. 6 illustrates a top view of the interior of the pet food dispenser wherein the crank shaft is removed in an alternative embodiment.
Figure 7:
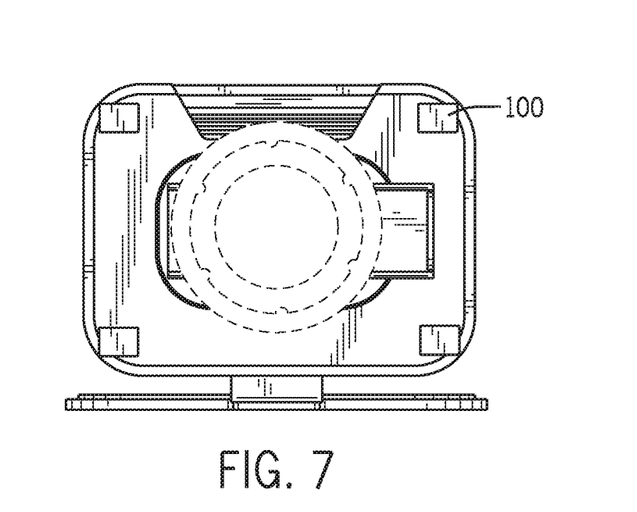
FIG. 7 illustrates a bottom view of the pet food dispenser in an embodiment.

In an embodiment, the bottom 7 of the main housing unit 5 may be tapered 33 so that pet food 20 located within the generally hollow interior 12 of the main housing unit 5 is directed downward toward an opening 25 (FIG. 6). More specifically, the bottom 7 of the main housing unit 5 may have an opening 25 which allows the pet food 20 to pass from within the generally hollow interior 12 to out of the main housing unit 5. As discussed below, the opening 25 at the bottom 7 of the main housing unit 5 has an air-tight seal as well as the top 6 of the device 1 so as to provide an air-tight seal for all the openings of the device 1 making the unit completely air-tight.

Figure 3:
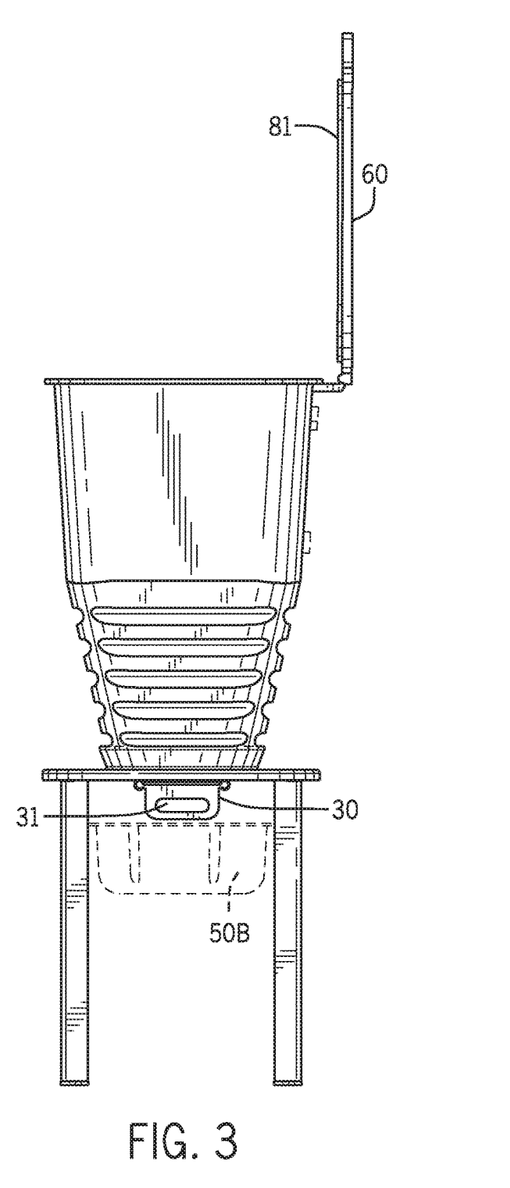
FIG. 3 illustrates a side view of the pet food dispenser.
Figure 4:
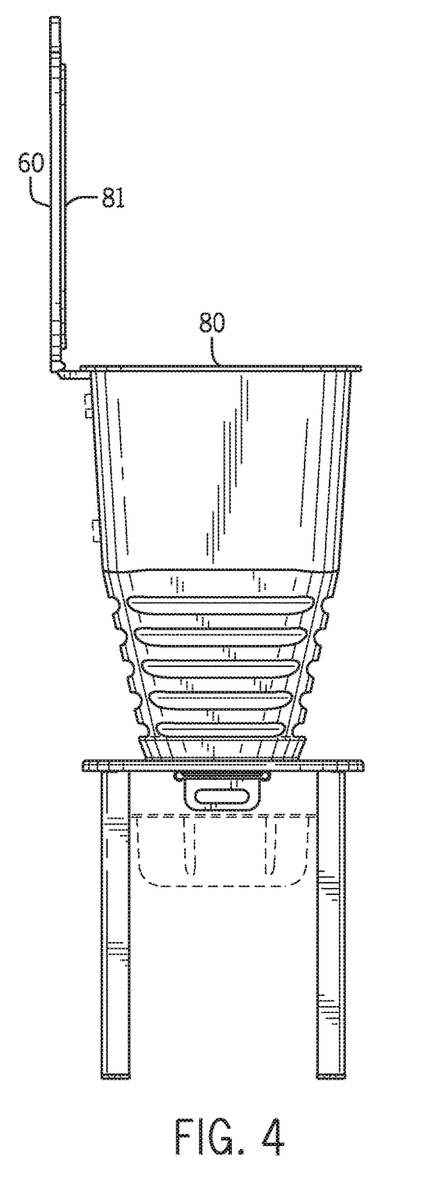
FIG. 4 illustrates a side view of the pet food dispenser.
Figure 11:
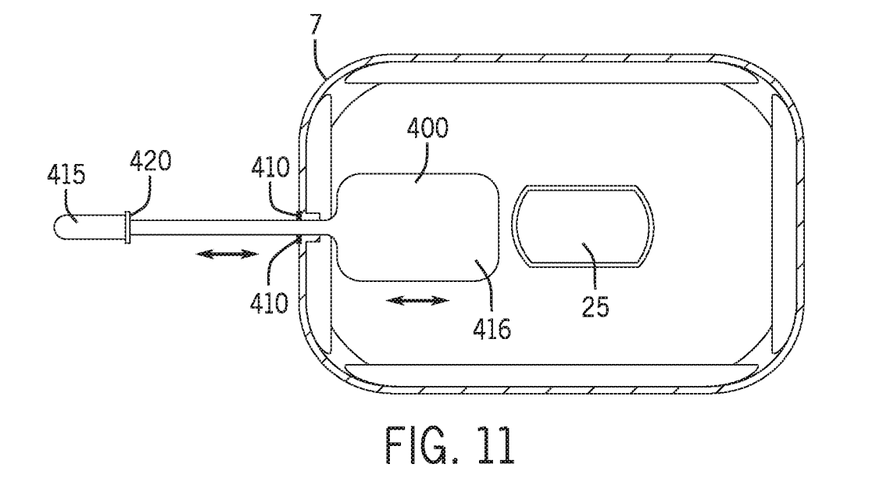
FIGS. 11 and 12 illustrate an alternative embodiment for releasing the pet food from the interior of the main housing unit wherein the alternative embodiment utilizes a sliding closing shield as opposed to a crank shaft.

In an alternative embodiment, the device 1 may have a movable locking plate 30 to having an opening/handle portion 31 (FIG. 3) wherein the movable locking plate 30 may be temporarily located beneath the opening 25. When the movable locking plate 30 is in a first position (FIG. 1), the opening 25 of the main housing unit 5 is blocked and the pet food 20 located within the generally hollow interior 12 of the main housing unit 1 cannot exit the interior 12 of the main housing unit 5 through the opening 25. In the second position (FIG. 6), the movable locking plate 30 is pulled away from the opening 25 so that food 20 may pass through the opening 25 by gravity. Once the proper amount of food 20 passes through the opening 25, the movable locking plate 30 may be pushed back to the first position so that the pet food 20 is again stopped from passing through the opening 25. When pushed back to the first position the device is air-tight. In an embodiment, the opening 25 of the bottom 7 of the main housing unit 5 may be off-centered (as illustrated in FIG. 11) so that, in an alternative embodiment, a shifting crank shaft 200 may be utilized to dispense the pet food 20, as discussed below.

In an embodiment, a plurality of removable legs 100 may be located at the bottom 7 of the main housing unit 5. The plurality of removable legs 100 may elevate the main housing unit 5 so that access to the generally hollow interior 12 of the device 1 is easier and so that the opening 25 (FIG. 6) at the bottom 7 of the device 1 is elevated. In an embodiment, a receiving dish 50 may he located below the opening 25 of the main housing unit 5. In an alternative embodiment, a storage shelf 55 (FIG. 2) may be located beneath the opening 25. The storage shelf 55 may support the receiving dish 50. As a result, a user may use various sized receiving dishes 50 depending on the size of the pet to he fed. Further, a user may fill a first receiving dish 50A and then remove the first receiving dish 50A from the storage shelf 55 and then insert a second receiving dish 50B to feed a second pet. In an embodiment, the user may remove the legs 100 and mount the device 1 on a wall so that legs 100 are not needed. Holes 500 (FIG. 5) for receiving a securing mechanism such as a screw or nail) may be located on the back 9 of the device 1 to hang the device 1 on the wall.

In an embodiment, as stated above, the main housing unit 5 may be removable from the leg portion. In particular, the plurality of legs 100 may be secured to a leg support 125. The main housing unit 5 may snap on and may be temporarily secured to the leg support 125. When a user wishes to clean the generally hollow interior 12 of the main housing unit 5, the user may unsnap the main housing unit 5 from the leg support 125. In an embodiment, the leg support 125 may have an indentation portion 150 (FIG. 1). The indentation portion 150 may allow a user to more easily grasp and move the receiving dish 50.

Figure 8:
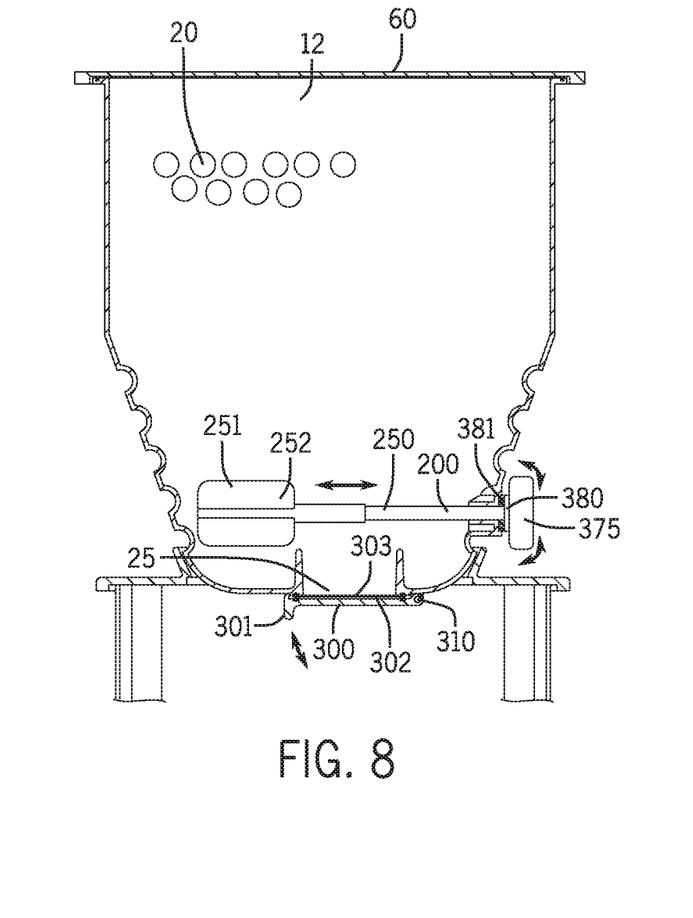
FIG. 8 illustrates a cross sectional view of the bottom and interior of the pet food dispenser wherein the crank handle is in the first position.
Figure 9:
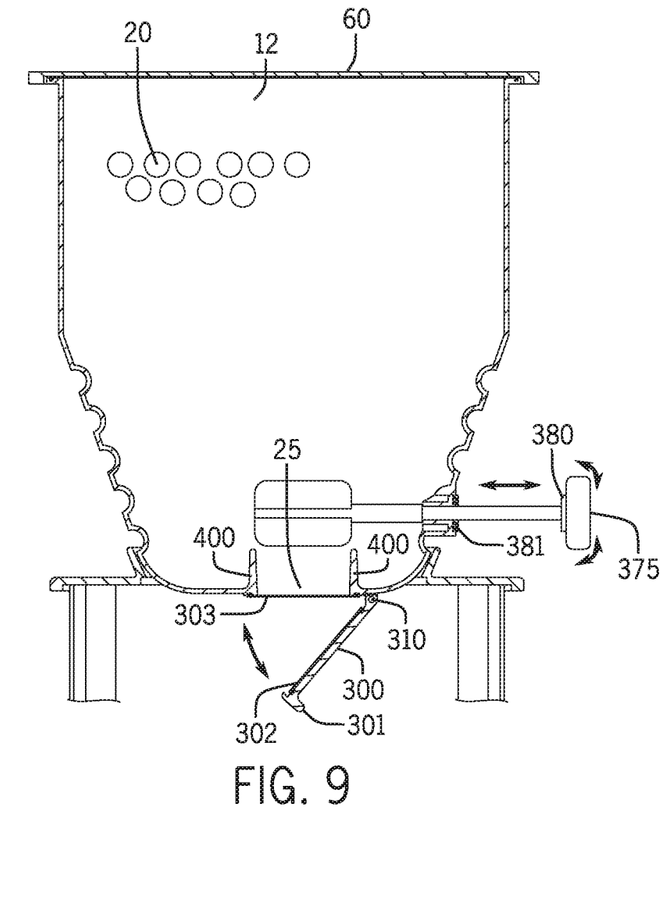
FIG. 9 illustrates a cross sectional view of the bottom and interior of the pet food dispenser wherein the crank handle is in the second position and ready to dispense a limited amount of pet food.
Figure 10:
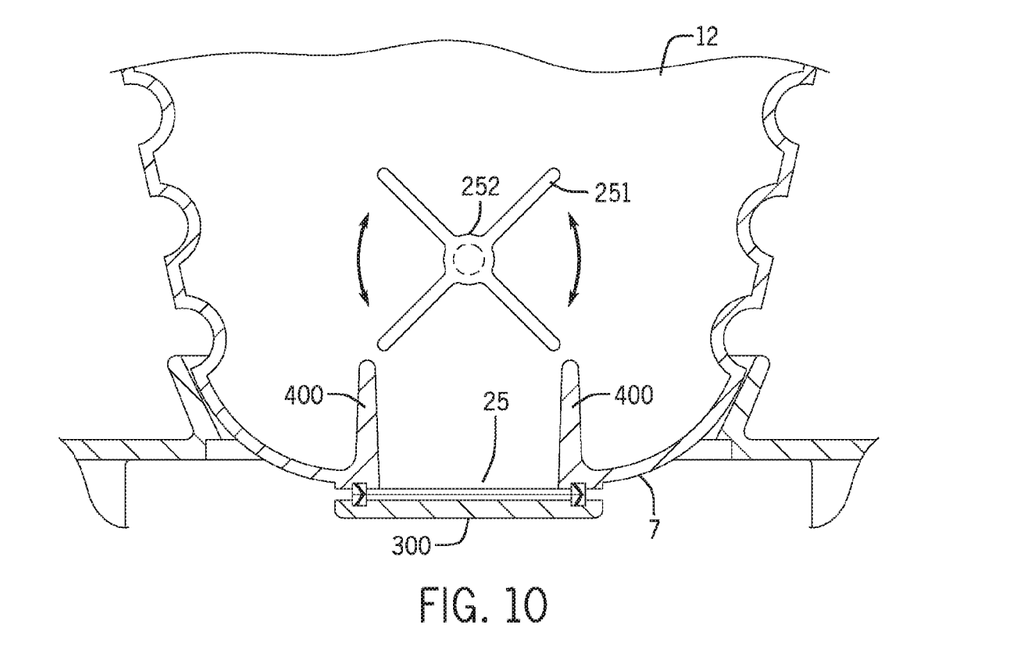
FIG. 10 illustrates a side view of the crank shaft portion of the pet food dispenser in an embodiment.

Referring now to FIGS. 8 and 9, in an alternative embodiment, the pet food dispenser 1 may have a shifting crank shank 200 which allows a user to dispense pet food 20 through the opening 25 of the bottom 7 of the main housing unit 5. The crank shaft 200 may have a cylindrical unit 250 having a smooth exterior surface and a receiving unit 251 wherein the receiving unit 251 has a plurality of receiving compartments 25L (FIG. 10 illustrates a side view) which rotate and wherein a limited amount of pet food 20 may fall into the individual receiving compartments 252 via gravity. The smooth cylindrical unit 250 of the crank shaft 200 may extend outside of the main housing unit 5 via an opening (not visible) and may be connected to a handle 375; the receiving compartments 252 of the crank shaft 200 remain within the interior 12 of the main housing unit 5. When the crank shaft 200 is rotated by the handle 375 located outside of the main housing unit 5, the crank shaft rotates 200 and pet food 20 located within an individual receiving compartment 252 is rotated toward the bottom 7 of the main housing unit 5 wherein it can exit the main housing unit 5 via the opening 25 and a second lid 300 at the bottom 7 of the main housing unit 5.

FIG. 8 illustrates the crank shaft 200 in the first orientation and FIG. 9 illustrates the crank shaft 200 in the second orientation. In the first orientation, the crank shaft 200 may be prevented from rotating. In particular, a rubber gasket seal 380 located on the back of the handle 375 correspondingly mates with a second rubber seal gasket 381 located on the exterior of the main housing unit 5. When the rubber seal gasket 380 of the handle 375 and the rubber seal gasket 381 of the exterior of the main housing unit 5 are mated, an air-tight seal is created and the pet food 20 located inside the device remains fresh. Further, when the rubber gasket seals 380, 381 are mated, the handle 375 may not be rotated.

In one embodiment, to remove pet food 20 from the interior 12 of the main housing unit 5 via the handle 375, the handle 375 is pulled away from the side of the main housing unit 5 into the second orientation as illustrated in FIG. 9. When the handle 375 is pulled away from the main housing unit 5, the receiving unit 251 of the crank shaft 200 is then moved as a result of being connected to the handle 375. In particular, in the first position, the receiving unit 251 is not located directly over the opening 25 of the bottom 7 of the main housing unit 5; however, when the handle 375 is pulled into the second position (FIG. 9) the receiving unit 251 then moves to a location above the opening 25 of the bottom 7 of the main housing unit 5. Once over the opening 25, the crank shaft 200 may be rotated clockwise or counter-clockwise and the individual receiving compartments 252 may then accept pet food 20. As such, the user may control the amount of pet food 20 which exits the device 1.

As stated above, the device 1 may have a second lid 300 which is located at the bottom 7 of the main housing unit 5. The second lid 300 may have a handle 301. The second lid 300 may be secured at a hinge 310. The second lid 300 may have a rubber seal gasket 302 which correspondingly mates with a rubber seal gasket 303 permanently located on the bottom 7 of the main housing unit 5 and surrounding the opening 25. When the second lid 300 is snapped into the closed position, the rubber seal gasket 302 of the lid 300 mates with the rubber seal gasket 303 of the bottom 7 of the main housing unit 5 and therein creates an air-tight seal (at the bottom) to protect the freshness of the pet food 20 located in the interior 12 of the main housing unit 5.

In an embodiment, a plurality of dividers 480 (forming a hopper) may be present on the bottom 7 of the main housing unit 5, within the interior of the device 1. The dividers 480 may prevent pet food 20 from falling into the opening 25 without first passing through the individual receiving compartments 252 of the receiving unit 251. As a result, when the user desires to pull the handle 375 into the second orientation (FIG. 9) all the pet food 20 must then pass through the receiving unit 251 prior to exiting the bottom 7 of the device 1. As stated below, the user may alternatively remove the pet food 20 while the crank shaft 200 is in the first position (FIG. 8) if a larger quantify of pet food 20 is desired.

In an embodiment, to release the pet food 20 from the interior 12 of the device a user may first pull the handle 301 of the second lid 300 of the bottom 7 of the device 1 so that the rubber gasket seal 302 of the lid 300 is pulled away from the rubber gasket seal 303 of the bottom 7 of the device 1. The opening 25 of the bottom 7 is then exposed. The handle 375 of the crank shaft 200 may then be pulled away from the side of the main housing unit 5 (into the second orientation of FIG. 9) so that the handle 375 may be rotated and so that the receiving unit 251 may now above the opening 25. The handle 375 is then rotated allowing the limited pet food 20 located in a single receiving compartment 252 to release the pet food 20 through the opening 25. The user may elect a single turn or multiple turns of the handle 375 depending on the desired amount of pet food 20 the user wishes to release. The pet food 20 may then fall into the receiving dish 50. To close and reseal the device 1, the handle 375 is pushed back in and the second lid 300 resealed to the bottom 7 of the main housing unit 5.

As illustrated in FIG. 8, a user may elect to move the crank shaft 200 away from the opening 25 so as to allow the food 20 to directly access the opening 25 once the lid 300 of the bottom 7 is opened. In other words, the user may release the pet food 20 while the crank shaft 200 is in the first orientation of FIG. 8. As a result, the food 20 may flow out of the device 1 quicker if this option is selected whereas use of the crank shaft 200 in the position directly over the opening 25 (FIG. 9) only allows food 20 in the receiving compartment 252 to exit through the opening 25. Thus, a user may determine the desired flow of the pet food 20.

Figure 12:
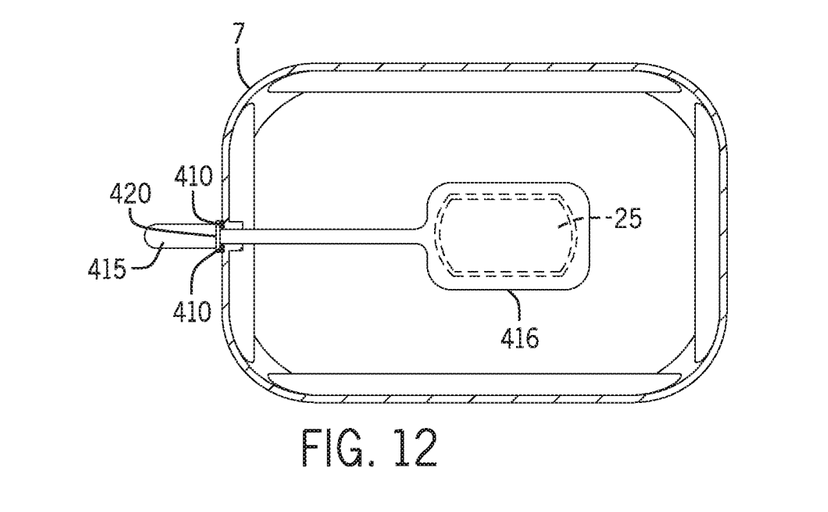

FIGS. 11 and 12 illustrate an alternative embodiment to releasing the pet food 20 from the main housing unit 5. The alternative embodiment still utilizes the identical lid 300 of the bottom 7 of the main housing unit 5 and the rubber gaskets 302 and 303) but instead of the crank shaft 200, the alternative embodiment utilizes a sliding closing shield 400 which moves from a first orientation (FIG. 11) inside the main housing unit 5 wherein the sliding closing shield 400 is not located above the opening 25 to a second orientation (FIG. 12) wherein the sliding closing shield 400 is located above the opening 25. In particular, the sliding closing shield 400 may have a generally rectangular covering 416 that may be selectively moved over the opening 25 to prevent pet food 20 from passing through the opening 25. When the handle portion 415 (which extends out of the main housing unit 5 through an opening (not shown) is pulled away from the main housing unit 5, the rectangular covering 416 does not cover the opening 25. When the handle is pushed inward, toward the center of the main housing unit 5, the rectangular covering 416 covers the opening 25. Thus, in this embodiment, the user must both open the lid 300 and pull the handle portion 415 away in order for the pet food 20 to exit the interior 12 of the device 1.

In the second orientation (FIG. 12), a rubber seal gasket 420 on the handle aligns with and correspondingly engages a rubber seal gasket 410 of the main housing unit. When the gaskets 410, 420 are aligned, an air-tight seal is created. To release the pet food 20 from the interior 12 of the device 1, the handle 415 is pulled therein moving the rectangular covering 416 from the opening 25, and then the second lid 300 is opened on the bottom 7 allowing pet food 20 to pass through the opening 25 into the receiving dish 50. When enough pet food 20 passes, the handle 415 is pushed back into the second orientation and then the lid 300 is replaced. In the embodiment with the sliding closing shield 400, the device 1 still utilizes the same second lid 300 and gasket seals. As a result, the device 1 then has an air-tight seal around surrounding the entire main housing unit 5 therein keeping the pet food 20 fresh.

Finally, in the embodiment of FIG. 6, the device 1 may lack both a crank shaft 200 and a sliding closing shield 400 which has a handle portion 415 which exits from an opening the side 10 of the main housing 5. Instead, in the embodiment of FIG. 6, the movable locking plate 30 is located below the bottom 7 of the main housing unit 5. An air-tight seal is also utilized in the movable locking plate 30 embodiment of FIG. 6.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A pet food dispenser comprising:
    a main housing unit having a top perimeter forming an opening, a bottom, a front, a back, a first side, a second side and a generally hollow interior;
    a second opening at the bottom of the main housing unit;
    a lid hinged to the top of the main housing unit;
    a rubber seal gasket located on an underside of the lid and a second rubber seal gasket located on the top perimeter of the main housing unit, wherein the rubber seal gasket of the underside of the lid mates with the second rubber seal gasket of the top perimeter of the main housing unit and creates an air-tight seal;
    wherein pet food inserted through the opening of the top of the main housing unit and exits the second opening at the bottom of the main housing unit;
    a movable crank shaft having a plurality of receiving compartments and wherein the plurality of receiving compartments is capable of receiving a limited amount of pet food in each compartment and wherein the receiving compartments move from a first position wherein the receiving compartment is not located above the second opening at the bottom of the main housing unit to a second position wherein the receiving compartments are located directly above the second opening at the bottom of the main housing unit.

2. The pet food dispenser of claim 1 further comprising:
    a leg support unit secured to the bottom of the main housing unit wherein the leg support unit has a plurality of removable legs.

3. The pet food dispenser of claim 1 further comprising:
    an opening located on the back of the main housing unit wherein the opening of the back of the main housing unit is capable of receiving a securing mechanism for securing the main housing unit to a wall.

4. The pet food dispenser of claim 1 further comprising:
    a lid hinged to the bottom of the main housing unit wherein the hinged lid is capable of temporarily and selectively covering the second opening at the bottom of the main housing unit.

5. The pet food dispenser of claim 4 wherein the hinged lid at the bottom of the main housing unit has an underside having a rubber seal gasket which temporarily and correspondingly mates with a second rubber seal gasket permanently located around the second opening of the bottom of the main housing unit to form an air-tight seal.

6. The pet food dispenser of claim 1 further comprising:
    a plurality of dividers located within the interior of the main housing unit wherein the plurality of dividers forms a hopper within the interior of the main housing unit and wherein the plurality of dividers surrounds the second opening at the bottom of the main housing unit and wherein the plurality of dividers prevents pet food from passing through the second opening at the bottom of the housing when the receiving compartments are in the second position and wherein the plurality of dividers do not prevent pet food from passing through the second opening at the bottom of the housing when the receiving compartment is in the first position.

7. The pet food dispenser of claim 1 further comprising:
    a sliding closing shield located within the interior of the main housing unit wherein the sliding closing shied moves from a first position to a second position.

8. The pet food dispenser of claim 7 wherein the sliding closing shield covers the second opening of the bottom of the main housing unit in the first position and does not cover the second opening of the bottom of the main housing unit in the second position.

9. The pet food dispenser of claim 7 further comprising:
    a handle portion secured to the sliding closing shield.

10. The pet food dispenser of claim 9 wherein the handle portion partially extends outside of the main housing unit and partially within the interior of the main housing unit.

11. The pet food dispenser of claim 10 further comprising:
    a rubber seal gasket located on the handle portion of the sliding closing shield.

* * * * *